United States Patent
Stohler et al.

(10) Patent No.: US 10,357,849 B2
(45) Date of Patent: Jul. 23, 2019

(54) CONNECTING SEAM BETWEEN TWO THIN-WALLED SHEET-METAL PARTS

(71) Applicant: Audi AG, Ingolstadt (DE)

(72) Inventors: Frank Stohler, Ölbronn-Dürrn (DE); Gerhard Gaull, Neuburg (DE); Jochen Rintelmann, Dessau (DE)

(73) Assignee: AUDI AG, Ingolstadt (DE)

( * ) Notice: Subject to any disclaimer, the term of this patent is extended or adjusted under 35 U.S.C. 154(b) by 480 days.

(21) Appl. No.: 15/112,124

(22) PCT Filed: Nov. 27, 2014

(86) PCT No.: PCT/EP2014/003183
§ 371 (c)(1),
(2) Date: Jul. 15, 2016

(87) PCT Pub. No.: WO2015/106781
PCT Pub. Date: Jul. 23, 2015

(65) Prior Publication Data
US 2016/0325379 A1 Nov. 10, 2016

(30) Foreign Application Priority Data
Jan. 18, 2014 (DE) .............. 10 2014 000 618

(51) Int. Cl.
| | |
|---|---|
| *B23K 26/24* | (2014.01) |
| *B23K 26/244* | (2014.01) |
| *B23K 1/005* | (2006.01) |
| *B23K 33/00* | (2006.01) |
| *B23K 26/32* | (2014.01) |
| *B23K 26/323* | (2014.01) |

(Continued)

(52) U.S. Cl.
CPC .......... *B23K 26/244* (2015.10); *B23K 1/0056* (2013.01); *B23K 26/32* (2013.01); *B23K 26/323* (2015.10); *B23K 33/002* (2013.01); *B23K 2101/006* (2018.08); *B23K 2103/50* (2018.08)

(58) Field of Classification Search
CPC ....... B23K 26/24; B23K 26/244; F16L 23/00; F16L 23/026; F16L 23/032
See application file for complete search history.

(56) References Cited

U.S. PATENT DOCUMENTS
| | | |
|---|---|---|
| 2001/0047983 A1 | 12/2001 | Degawa et al. |
| 2008/0017696 A1 | 1/2008 | Urech et al. |

FOREIGN PATENT DOCUMENTS
| | | |
|---|---|---|
| CN | 1988981 | 6/2007 |
| DE | 100 17 453 | 10/2001 |
| DE | 195 23 005 | 5/2006 |

(Continued)

OTHER PUBLICATIONS

Christopher Dawes: "Single and multi-pass welding with filler materials", Cambridge, England, Dec. 31, 1992.

(Continued)

*Primary Examiner* — Adam Krupicka
(74) *Attorney, Agent, or Firm* — Henry M. Feiereisen LLC

(57) ABSTRACT

A connecting seam is formed between two thin-walled sheet-metal parts as a laser weld seam or laser soldered seam as additional material is supplied, respectively. The sheet-metal parts have flange portions for formation of a connecting region. At least one flange portion includes in the region of a joining zone a bead which is at least partially surrounded or filled by solidified melt from seam material after the production of the connecting seam.

20 Claims, 5 Drawing Sheets

(51) Int. Cl.
  *B23K 101/00* (2006.01)
  *B23K 103/00* (2006.01)

(56) References Cited

FOREIGN PATENT DOCUMENTS

| DE | 102005015860 | 10/2006 |
| DE | 10 2005 042 361 | 3/2007 |
| EP | 1 504 840 | 2/2005 |
| JP | 2006167764 | 6/2006 |
| WO | WO 2005/118211 | 12/2005 |

OTHER PUBLICATIONS

International Search Report issued by the European Patent Office in International Application PCT/EP2014/003183 dated Mar. 26, 2015.
Chinese Search Report dated Sep. 15, 2017 with respect to counterpart Chinese patent application 201480073294.9.
Translation of Chinese Search Report dated Sep. 15, 2017 with respect to counterpart Chinese patent application 201480073294.9.

CONNECTING SEAM BETWEEN TWO THIN-WALLED SHEET-METAL PARTS

CROSS-REFERENCES TO RELATED APPLICATIONS

This application is the U.S. National Stage of International Application No. PCT/EP2014/003183, filed Nov. 27, 2014, which designated the United States and has been published as International Publication No. WO 2015/106781 and which claims the priority of German Patent Application, Serial No. 10 2014 000 618.2, filed Jan. 18, 2014, pursuant to 35 U.S.C. 119(a)-(d).

BACKGROUND OF THE INVENTION

The invention relates to a connecting seam between two thin-walled sheet-metal parts.

A connecting seam is known from DE1952300584. Such a configuration of a laser weld seam has basically proven its worth. However, it has been repeatedly shown that one of the two sheet-metal parts involved in the laser weld seam has local sink marks in a visible area of the vehicle body. Such sink marks are unacceptable surface defects that adversely affect the visual appearance of the vehicle body. Such sink marks must be removed during manual refinishing works before a vehicle body is painted. This is time-consuming and cost-intensive. In some cases, computer tomography test (CT scans) found cracks in the flange region of one of the metal sheets.

FIG. 5 shows an example of a laser soldered seam according to the prior art. FIG. 5 shows schematically a connecting seam 100 which connects two thin-walled sheet-metal parts 200, 300 and is arranged in a flange region of two adjacent flange portions 200', 300' while forming a joining zone F. In such a configuration of the connecting seam 100, the presence of thermally induced shear stress, in particular in the sheet-metal part 300 with obtuse flange portion 300', can cause sink marks E, which is unwanted.

SUMMARY OF THE INVENTION

Object of the invention is therefore to refine a generic connecting seam such as to prevent sink marks and to realize a flawless connecting seam, in particular without damages (cracks) in connection flanges.

This object is achieved according to the invention by a connecting seam which is formed between two thin-walled sheet-metal parts as a laser weld seam or as a laser soldered seam, in particular with supply of additional material, respectively, wherein the sheet-metal parts have flange portions for formation of a connecting region. Such a connecting seam is characterized in that at least one flange portion is provided in the region of a joining zone with a bead, which is at least partially surrounded, in particular completely filled, by solidified melt of seam material after the connecting seam has been produced.

Advantageous embodiments are set forth in the subclaims.

Such a bead merely involves in accordance with the invention a thermal bead which is temporarily effective during production of the connecting seam and which after the production is at least in part surrounded and/or filled by solidified melt of the additional material, in particular completely surrounded and/or filled by solidified melt of the additional material. This enables during the production of the connecting seam a temporary length compensation and/or a temporary absorption of shear stress, encountered during the production of the laser weld seam or laser soldered seam. It has been shown that this measure was able to significantly reduce the presence of sink marks, even to prevent them altogether, so that the refinishing work is significantly reduced. Furthermore, cracks in one of the flange portions of the sheet-metal parts involved in the connecting seam were no longer detected. It is essential in the invention that the bead is arranged in the region of the joining zone of the connecting seam, with the joining zone of the connecting seam being understood to be one the region in which solidified solder in the event of a laser soldered seam or solidified weld material and/or re-solidified molten material of the sheet-metal parts is present. When positioned outside the joining zone, the bead may either no longer fulfill the desired effect according to the invention or is e.g. in an optically visible area of a vehicle body, which is not desirable. Observations could be made that when the bead is arranged in a region of the flange portion that extends from the joining zone of the connecting seam up to the free ends of the flange portions, the provision of the bead has no effect.

According to a preferred embodiment, the bead is arranged in the joining zone such that after the connecting seam has been produced the bead is completely surrounded and/or filled by solidified melt of the additional material or by the solder and/or covered after production of the connecting seam. This measure has been shown to be especially good to prevent the presence of sink marks.

According to a further embodiment, the bead is introduced into the flange portion of one or both of the involved thin-walled sheet-metal parts such that a joining gap between the thin-walled sheet-metal parts in the region of the joining zone is expanded in cross section. As a result, it becomes possible to fill the bead especially well with additional material or molten material of the involved sheet-metal parts.

According to a further embodiment of the invention, when one flange portion, extending at an obtuse angle in relation to the pertaining sheet-metal part, and one flange portion of the other sheet-metal part, extending at an acute angle, meet, the bead is formed in the flange portion extending at an obtuse angle. It has been shown that in such a constellation of the two flange portions relative to the associated sheet-metal parts, the sink marks preferably occur in the sheet-metal part having a flange portion extending at an obtuse angle. By providing the bead there, sink marks can be reliably prevented.

According to a further embodiment of the invention, the bead is configured in terms of its longitudinal extension over the entire longitudinal extension of the connecting seam. In this way, the bead is effective over the entire length of the connecting seam.

As an alternative, the bead may also be configured along its longitudinal extension intermittently or with different bead depths. This is especially applicable, when due to other environmental conditions no sink marks are to be expected in regions of the connecting seam or there is only a decreased tendency for formation of sink marks. In such cases, the provision of the bead may, optionally, be omitted in some sections, or the bead may be formed with smaller bead depth, which has the advantage that less solder or welding wire, i.e. less additional material, is required in these regions, since a filling of the bead is not needed or needed only to a lesser extent.

Advantageously, the bead has an arcuate cross section. As a result of a bead that is arcuate in cross section in the absence of sharp bending edges, an improved shear stress relief is realized during the production of the connecting seam and thus the number and intensity of potential flaws, e.g. sink marks, are reduced. The bead may be configured in cross section symmetrically or asymmetrically.

It has proven advantageous to configure the bead depth such as to amount to about approximately 0.6 to 1.5 times, in particular is 0.6 to 1.1 times, the sheet-metal thickness of the sheet-metal part having the bead. It was found that in the presence of a bead depth greater than 1.1 times the sheet-metal thickness of the sheet-metal part having the bead, the ideally desired complete filling of the bead becomes increasingly more difficult and possibly cause problems. The reason for that is a premature solidification of melt, when the bead is of such a depth, before the bead is filled to the intended extent. Thus, a possibly incomplete filling of the joining gap may occur in joining gap direction, which is undesirable.

The connecting seam according to the invention is preferably applicable for sheet-metal parts of same type of material, e.g. both sheet-metal parts are made of a steel material or both sheet-metal parts are made from an aluminum material.

The connecting seam according to the invention can find application preferably also with a material mix, in which for example, the one sheet-metal part is a steel sheet-metal part and the other sheet-metal part is an aluminum sheet-metal part. In the presence of such a material pairing, thus in general when two materials are to be connected with the connecting seam according to the invention and have different thermal expansion coefficients, e.g. steel/aluminum, it is suitable to provide the bead in the one sheet-metal part made from the material with the higher thermal expansion coefficient.

According to another embodiment of the invention, the bead is arranged in the sheet-metal part of greater wall thickness, when the sheet-metal parts forming the connecting seam have different sheet-metal thicknesses. The sheet-metal part of greater wall thickness is more prone to the formation of sink marks due to shear stress which is encountered during the production of the connecting seam and can be better absorbed in this case by the bead in the sheet-metal part of greater wall thickness.

When referring to thin-walled sheet-metal parts, sheet-metal parts are to be understood in accordance with the invention, which are normally used in automotive body construction. Such sheet-metal thicknesses amount to 0.5 mm to 5 mm, in particular 0.6 mm to 3 mm.

BRIEF DESCRIPTION OF THE DRAWING

Further advantages and features of the invention will become apparent from the following exemplary description of a connecting seam according to the invention with reference to several exemplary embodiments.

It is shown in.

DETAILED DESCRIPTION OF PREFERRED EMBODIMENTS

Figure 1:
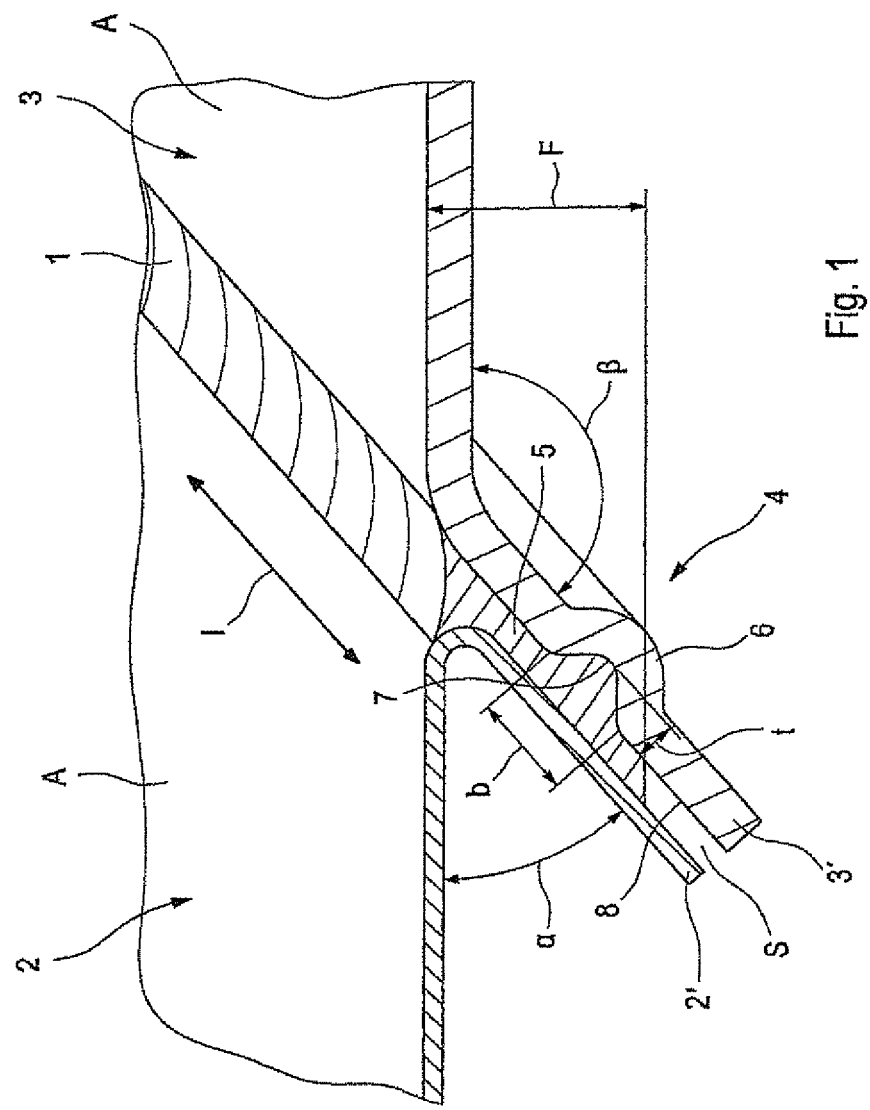
FIG. 1: an embodiment of the connecting seam according to the invention by way of an exemplified roof member and a sidewall frame of a vehicle body.

A connecting seam 1 according to the invention (FIG. 1) is formed between a first sheet-metal part 2 and a second sheet-metal part 3 It is manufactured as a laser weld seam or laser soldered seam by supplying additional material, i.e. in the case of a laser soldered seam by supplying solder, and in the case of a laser weld seam by supplying a welding wire. The sheet-metal parts 2, 3 have flanges 2', 3' which for formation of a connecting region 4 there between are placed adjacent to one another to form a joining gap s. The joining gap s can be 0 millimeter to a few tenths of a millimeter, for example up to 0.7 millimeter. During production of the connecting seam, seam material 5 penetrates from an outer side A of the involved sheet-metal parts 2, 3 by a piece into the joining gap s. This region of the joining gap s, filled with seam material 5, is referred hereinafter as joining zone F. The flange portion 3' of the sheet-metal part 3 has a bead 6 within the joining zone. The flange portion 2' of the first sheet-metal part 2 is hereby arranged in the cross sectional sketch of FIG. 1 at an acute angle α<90° relative to the sheet-metal part 2. The flange portion 3' of the second sheet-metal part 3 extends at an obtuse angle β>90°. The bead 6 is arranged in the flange portion 3', which extends at an obtuse angle.

In the embodiment of a connecting seam according to FIG. 1, the bead 6 is completely filled with seam material 5, with the bead 6 being introduced in the flange portion 3' such as to expand the joining gap s, i.e. a bead base 7 of the bead 6 is further away from the opposite flange portion 2' than the remaining flange portion 3'.

In the presence of an acute flange portion 2', for example, for values of α<80° and an obtuse flange portion 3', for example, for values of β>100°, it has proven beneficial to arrange the bead 6 preferably in the obtuse flange portion 3'. When the flange portions 2', 3, extend at a right angle or nearly at a right angle, i.e. for angle values of a between 80° and 90° and β between 90° and 100°, it can be equally appropriate to provide beads 6 in both flange portions 2', 3' within the joining zone F. The beads 6 can hereby be configured offset to each other or opposite to each other within the joining zone F.

When one of the sheet-metal parts 2, 3 has a sheet-metal thickness which is greater than the one of the other sheet-metal part 2, 3, the bead is preferably to be provided in the thicker one of the two sheet-metal parts 2, 3. In the exemplary configuration according to FIG. 1, the sheet-metal part 3 is drawn thicker than the sheet-metal part 2. The bead 6 has a bead depth t from the bead base 7 to an inner side 8 of the flange portion 3' in confronting relationship to the flange portion 2'. The bead depth t is preferably 0.6 to 1.5 times, in particular 0.6 to 1.1 times, a metal-sheet thickness d of the sheet-metal part 3, in which the bead 6 is arranged. The bead 6 may be formed continuously or intermittently along a longitudinal extension l of the connecting seam 1. In addition, the bead depth t can vary along the longitudinal extension l of the connecting seam 1. For example, portions of the bead 6 with smaller bead depth t are conceivable, so that less solder or welding wire to fill the bead is necessary.

The bead 6 has a bead width b, which may vary along the longitudinal extension l of the connection seam or is kept constant. Using the bead width b and the bead depth t, it is possible to structurally influence the capability of the bead 6 to absorb shear stress and thus to prevent sink marks and/or cracks.

Figure 2:
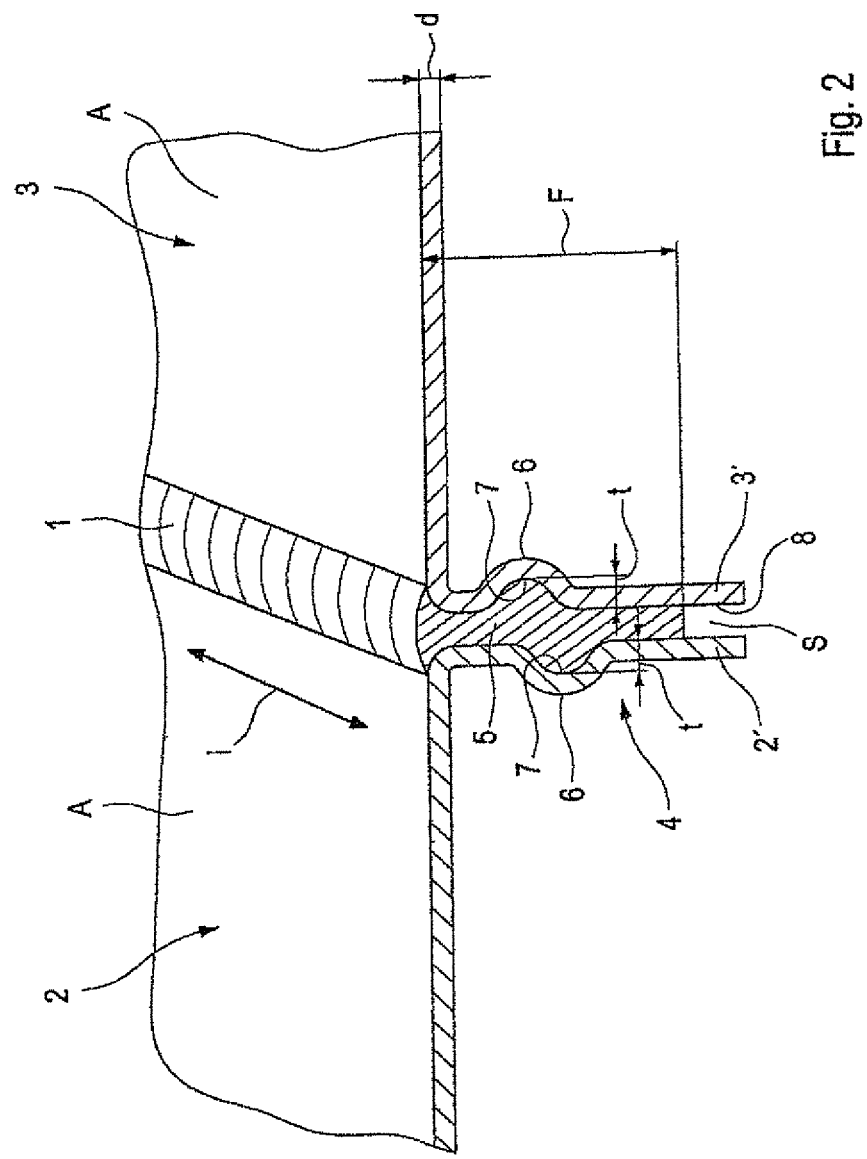
FIG. 2: a second embodiment of the connecting seam according to the invention.

In a further embodiment of the connecting seam 1 according to the invention 1, as shown in FIG. 2, both flange sections 2', 3' of the sheet-metal parts 2, 3 to be joined have each a bead 6. The beads 6 are arranged opposite or offset to one another, with both beads 6 expanding the joining gap s. The beads 6 can have a same three-dimensional shape in cross section, e.g. an arcuate three-dimensional shape. However, they may also have a three-dimensional shape which is different in cross section, in particular both the bead depth t of the beads 6 and the bead width b of the two beads 6 can be selected differently. In particular, it is beneficial to select the parameters b and t such as to suit the metal-sheet thickness d and/or other material properties of the sheet-metal parts 2, 3, for example, to suit their thermal expansion coefficient.

Figure 3:
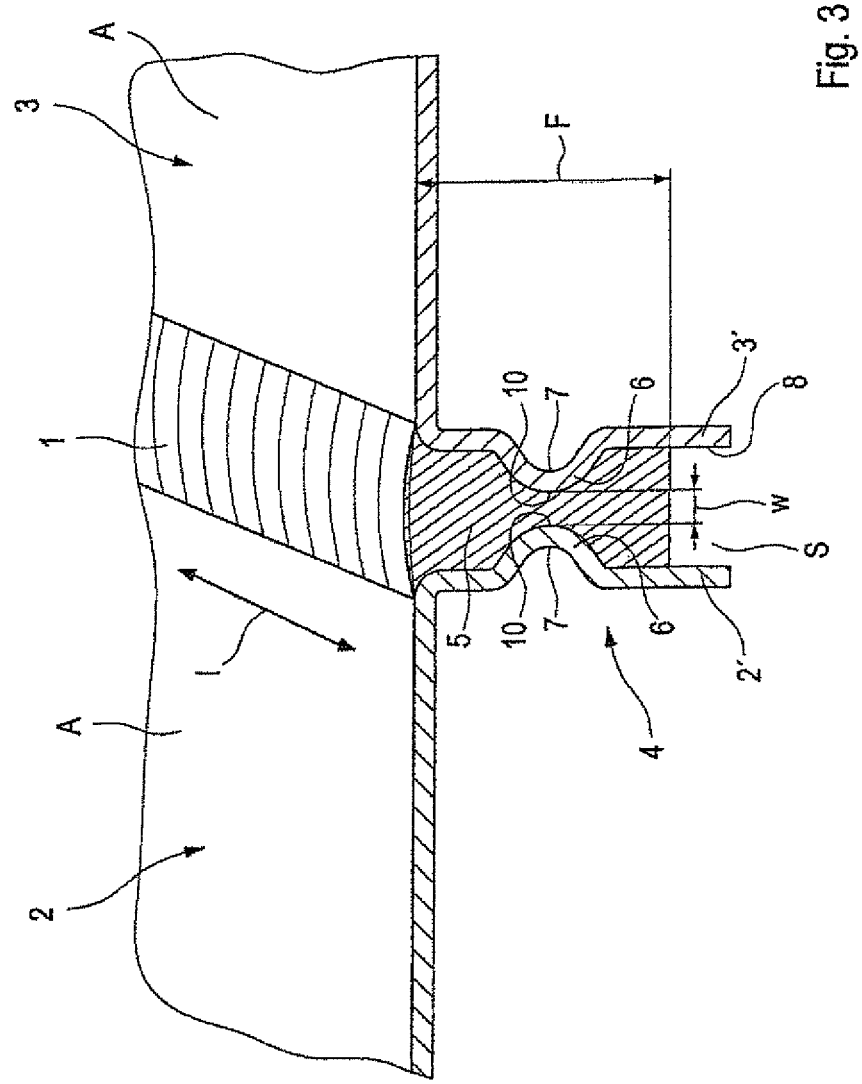
FIG. 3: a third embodiment of the connecting seam according to the invention.

A further embodiment of the connecting seam 1 according to the invention is shown in FIG. 3. In this embodiment, the beads 6 are introduced in the flange portions 2', 3' such that the beads 6 of both flange portions 2', 3' point to one another and are arranged to narrow the joining gap s. In the embodiment of FIG. 3, the beads 6 are completely surrounded with seam material 5. A clear width w between the beads 6 is hereby preferably zero millimeter up to a few tenths of a millimeter, in particular up to 0.7 mm. The remainder of the joining gap s is thus configured wider. When very small clear widths w are involved, for example in the range between 0 mm and 0.3 mm, seam material 5 can migrate in this embodiment of the connecting seam 1 according to the invention also only up to zeniths 10 in the joining gap s, so that the beads in such a case are surrounded by seam material 5 only in part, for example up to the zeniths 10 of seam material.

Figure 4:
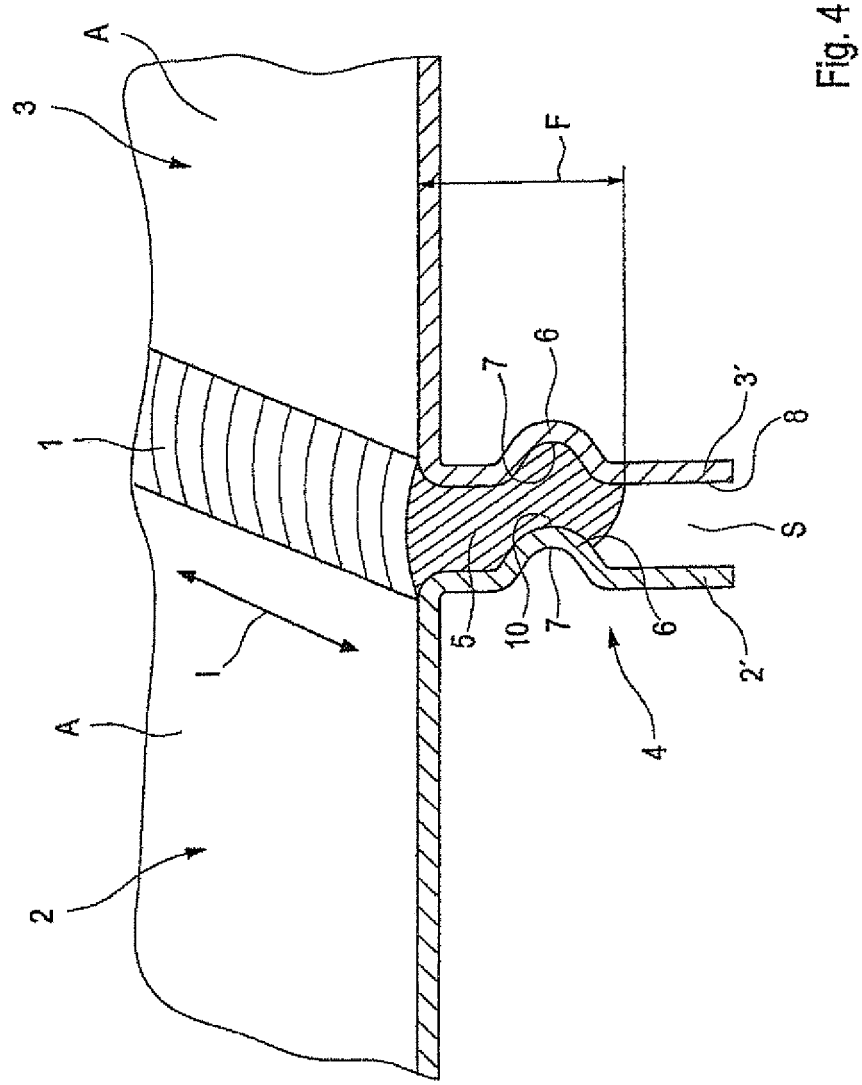
FIG. 4: a fourth embodiment of the connecting seam according to the invention.

In a further embodiment of the connecting seam 1 according to the invention according to FIG. 4, the beads 6 are oriented in a same direction, so that in the joining gap s a zenith 10 of the one bead 6, arranged for example in the flange portion 2', and a bead base 7 of the other bead 6, arranged for example in the flange portion 3', form together a part of the joining gap s. In this embodiment, an interior of the bead 6 is at least partially filled with seam material 5 and the other bead 6 is surrounded in the region of its zenith 10 by seam material 5 at least in part.

In the schematic sectional view of FIG. 1, the bead 6 is configured as arc-shaped with an arched section in the area of the bead base 7 and two arched sections in the transition region of the bead 6 to the flange portion 3'.

Figure 5:
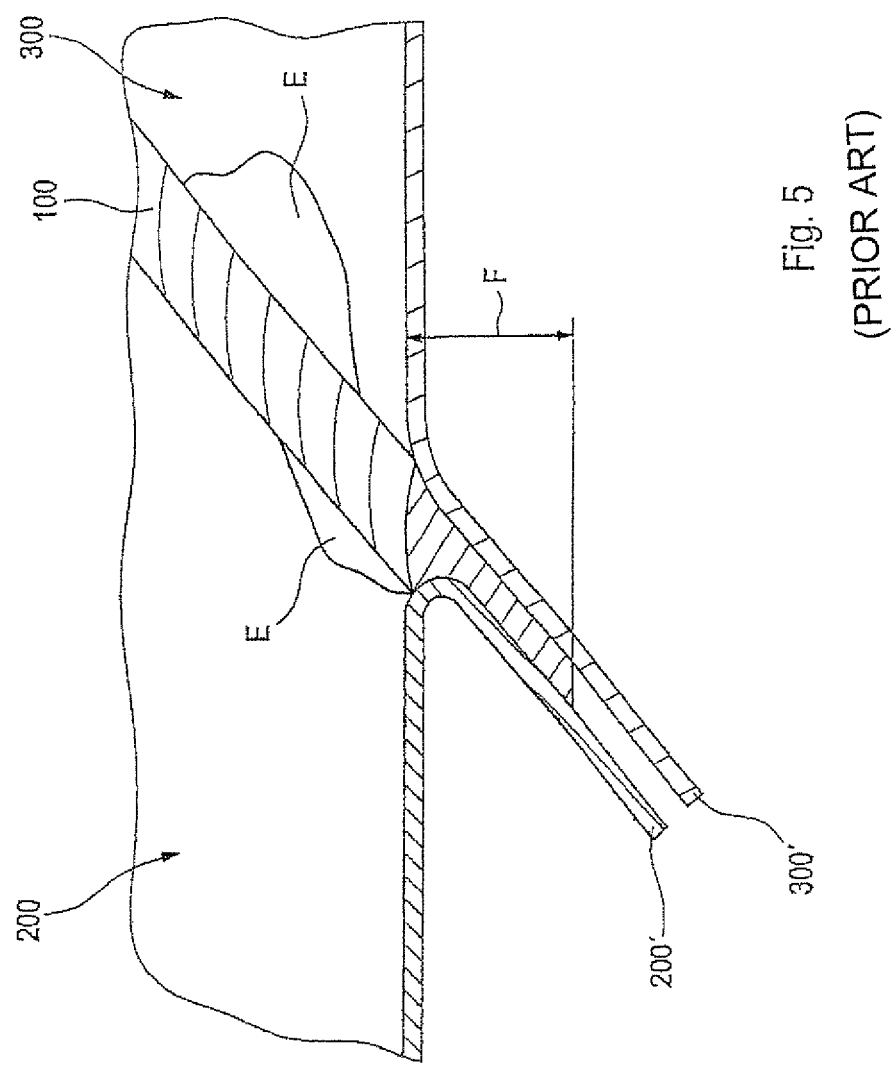
FIG. 5: a schematic representation of a prior art connecting seam.

FIG. 5 shows schematically a connecting seam 100 in accordance with the prior art. It connects two thin-walled sheet-metal parts 200, 300 and is arranged in the flange region of two adjacent flange portions 200', 300' while forming a joining zone F. In such a configuration of the connecting seam 100, the presence of thermally induced shear stress, in particular in the sheet-metal part 300 with obtuse flange portion 300', can cause sink marks E, which are prevented by the invention.

With the connecting seam according to the invention, the presence of sink marks, as repeatedly encountered in the prior art, is significantly reduced or even prevented, causing considerable savings in terms of refinishing work of a bodyshell before painting the bodyshell. Furthermore, it could be observed that cracks are no longer encountered in one of the flange portions 2', 3', which are involved in the connection seam.

What is claimed is:

1. A connecting seam formed between two thin-walled sheet-metal parts as a laser weld seam or laser soldered seam through supply of seam material, wherein the sheet-metal parts have flange portions for formation of a connecting region, at least one of the flange portions comprising in a region of a joining zone a bead, which is at least partially surrounded or filled by solidified melt from seam material after production of the connecting seam.

2. The connecting seam of claim 1, wherein the connecting region defines a joining gap, said bead being configured to expand the joining gap.

3. The connecting seam of claim 1, wherein the flange portion of one of the sheet-metal parts is configured to extend at an obtuse angle to said one of the sheet-metal parts, and the flange portion of the other one of the sheet-metal parts is configured to extend at an acute angle to said other one of the sheet-metal parts sheet-metal part, said bead being formed in the flange portion of the said other one of the sheet-metal parts.

4. The connecting seam of claim 1, wherein the bead is sized to extend over an entire longitudinal extension of the connecting seam.

5. The connecting seam of claim 1, wherein the connecting seam is formed as a fillet weld, as flanged seam, or as vertical seam.

6. The connecting seam of claim 1, wherein the bead is arcuate in cross section.

7. The connecting seam of claim 1, wherein the bead has a bead depth which is approximately 0.6 to 1.5 times, particularly 0.6 to 1.1 times, a sheet-metal thickness of the at least one of the flange portions.

8. The connecting seam of claim 1, wherein the sheet-metal parts are made of a same material, in particular of a steel material or an aluminum material.

9. The connecting seam of claim 1, wherein the bead is formed intermittently or with different bead depths along its longitudinal extension.

10. The connecting seam of claim 1, wherein the flange portions of the sheet-metal parts have different wall thicknesses, said bead being formed in the flange portion of greater wall thickness.

11. The connecting seam of claim 1, wherein the flange portions of the sheet-metal parts have different thermal expansion coefficients, said bead being formed in the flange portion having a higher one of the thermal expansion coefficients.

12. The connecting seam of claim 1, wherein the sheet-metal parts are made of different materials, in particular one of the sheet-metal parts is made of a steel material and the other one of the sheet-metal parts is made of an aluminum material.

13. A component assembly, comprising:
a first sheet-metal part having a flange portion; and
a second sheet-metal part having a flange portion extending adjacent to the flange portion of the first sheet-metal part to thereby define there between a connecting region for introduction of a seam material,
wherein at least one of the flange portions has formed therein a bead in the connecting region so that the flange portions are securely connected to one another in a joining zone with the aid of a laser-welded or laser-soldered connecting seam as the seam material solidifies to at least partially surround or fill the bead.

14. The component assembly of claim 13, wherein the flange portion of the first sheet-metal part is configured to extend at an obtuse angle to the first sheet-metal part, and the flange portion of the second sheet-metal part is configured to extend at an acute angle to the second sheet-metal part, said bead being formed in the flange portion of the second sheet-metal part.

15. The component assembly of claim 13, wherein the bead has a bead depth which is approximately 0.6 to 1.5 times, particularly 0.6 to 1.1 times, a sheet-metal thickness of the at least one of the flange portions.

16. The connecting assembly of claim 13, wherein the first and second sheet-metal parts are made of a material selected from the group consisting of steel material and aluminum material.

17. The component assembly of claim 13, wherein the flange portions of the first and second sheet-metal parts have different wall thicknesses, said bead being formed in the flange portion of greater wall thickness.

18. The component assembly of claim 13, wherein the flange portions of the first and second sheet-metal parts have different thermal expansion coefficients, said bead being formed in the flange portion having a higher one of the thermal expansion coefficients.

19. A method of connecting adjacent flange portions of two sheet-metal parts, comprising:
    forming a bead in one of the flange portions of the sheet-metal parts; and
    supplying a seam material in a connecting region between the flange portions to thereby securely connect the flange portions in a joining zone with the aid of a laser-welded or laser-soldered connecting seam as the seam material solidifies to at least partially surround or fill the bead.

20. The method of claim 19, wherein the bead is formed intermittently or with different bead depths along a length thereof.

* * * * *